UNITED STATES PATENT OFFICE.

SIDNEY F. SHERWOOD, OF WASHINGTON, DISTRICT OF COLUMBIA.

PROCESS OF MAKING A PALATABLE SYRUP FROM SUGAR-BEETS.

1,370,372.

Specification of Letters Patent.    Patented Mar. 1, 1921.

No Drawing.    Application filed May 19, 1920. Serial No. 382,613.

(FILED UNDER THE ACT OF MARCH 3, 1883, 22 STAT. L., 625.)

*To all whom it may concern:*

Be it known that I, SIDNEY F. SHERWOOD, a citizen of the United States of America, and an employee of the Department of Agriculture, residing in Washington, D. C., (whose post-office address is Department of Agriculture, Washington, D. C.,) have invented a new and useful Process of Making a Palatable Syrup from Sugar-Beets. This application is made under the act of March 3, 1883, chapter 143 (22 Stat. 625), and the invention herein described and claimed may be used by the Government of the United States, or any of its officers or employees, in the prosecution of work for the Government, and by any person in the United States, either in public or private work, without payment to me of any royalty thereon.

The object of my invention is to convert sugar beets into a palatable syrup.

In carrying out my invention, I wash the sugar beets, remove the tops and upper green portions, slice the beets—preferably after having removed the skin or peel—and allow the slices to fall directly into water—preferably warm. Sufficient water is used to maintain a depth over the slices of about one inch (more or less); this prevents the darkening of the freshly cut slices which takes place when they are exposed to the air, thereby lessening the amount of color in the final product. The mass of slices and water is then heated to 80 degrees centigrade, more or less, the vessel containing it covered, and allowed to stand for about an hour. The extract is then poured off and strained to remove fine particles, etc.

This extract, or a correspondingly similar extract prepared in any other manner, is then placed in an autoclave—or other container which may be securely sealed—provided with a controlled outlet for blowing off steam and ordinarily with a pressure gage and thermometer, heated to 108° to 110° centigrade (corresponding very closely to a pressure of 21 pounds per square inch) and maintained at this temperature for one hour, blowing off a considerable quantity of steam at approximately 15 minute intervals. Ordinarily this treatment serves to remove the characteristic and objectionable "beety" flavor. When it is considered advisable, higher temperatures (and correspondingly higher pressures) may be used, while the length of time of heating may be increased or decreased.

The extract is then removed from the autoclave, strained to remove the material which has been coagulated and precipitated out, and evaporated directly to a syrup removing what scums form during the process of evaporation. The final product constitutes a palatable syrup.

The residue remaining after removal of the extract from the beets is best adapted as a feeding material.

I claim:

A process of making an edible syrup from sugar beets, consistsing in heating sugar beets in water, separating the liquid from beets the solid portion of said mixture, heating said liquid in an autoclave at a temperature of approximately 109° C. for a period of approximately one hour, and blowing off a substantial quantity of steam at approximately 15 minute intervals during the said heating to eliminate from said liquid all objectionable flavors.

SIDNEY F. SHERWOOD.